United States Patent
Wada et al.

(10) Patent No.: US 7,973,100 B2
(45) Date of Patent: Jul. 5, 2011

(54) POLYPROPYLENE RESIN AND BLOW MOLDED CONTAINER

(75) Inventors: Isao Wada, Chiba (JP); Hiroyuki Uekita, Chiba (JP)

(73) Assignees: Mitsu Chemicals, Inc., Tokyo (JP); Prime Polymer Co., Ltd., Tokyo (JP)

( * ) Notice: Subject to any disclaimer, the term of this patent is extended or adjusted under 35 U.S.C. 154(b) by 292 days.

(21) Appl. No.: 12/310,883

(22) PCT Filed: Sep. 12, 2007

(86) PCT No.: PCT/JP2007/067724
§ 371 (c)(1),
(2), (4) Date: Mar. 11, 2009

(87) PCT Pub. No.: WO2008/032735
PCT Pub. Date: Mar. 20, 2008

(65) Prior Publication Data
US 2010/0040813 A1    Feb. 18, 2010

(30) Foreign Application Priority Data
Sep. 12, 2006    (JP) ................................ 2006-247088

(51) Int. Cl.
C08K 5/527    (2006.01)
C08K 5/053    (2006.01)

(52) U.S. Cl. ........................................ 524/117; 524/387

(58) Field of Classification Search .................. 524/117, 524/387
See application file for complete search history.

(56) References Cited

U.S. PATENT DOCUMENTS
2006/0247395 A1* 11/2006 Gauthier et al. ................ 526/64

FOREIGN PATENT DOCUMENTS

| JP | 10-152530 A | 6/1998 |
|---|---|---|
| JP | 11-255982 A | 9/1999 |
| JP | 2000-191858 A | 7/2000 |
| JP | 2000-198891 A | 7/2000 |
| JP | 2002-275331 A | 9/2002 |
| JP | 2003-286377 A | 10/2003 |
| WO | WO 2006/118932 A1 | 11/2006 |

* cited by examiner

*Primary Examiner* — Peter Szekely
(74) *Attorney, Agent, or Firm* — Foley & Lardner LLP

(57) ABSTRACT

Polypropylene resins of the present invention give blow molded containers excellent in transparency, impact resistance and flexibility. Stretch blow molded containers obtained from the polypropylene resins enable volume reduction and weight reduction. A polypropylene resin includes a random polypropylene (P1) having MFR (ASTM D 1238, 230° C., 2.16 kg load) of 0.5 to 100 g/10 min and an ethylene content of 3.0 wt % to less than 7.0 wt %, (i) the resin containing the random polypropylene (P1) at not less than 80 wt %, (ii) the resin showing a broad DSC melting curve which has a single melting point peak and in which the maximum intensity peak temperature (Tm) is not more than 120° C. and the half-value width on a higher temperature side from the maximum intensity peak is not less than 20° C.

8 Claims, 2 Drawing Sheets

[Fig.1]
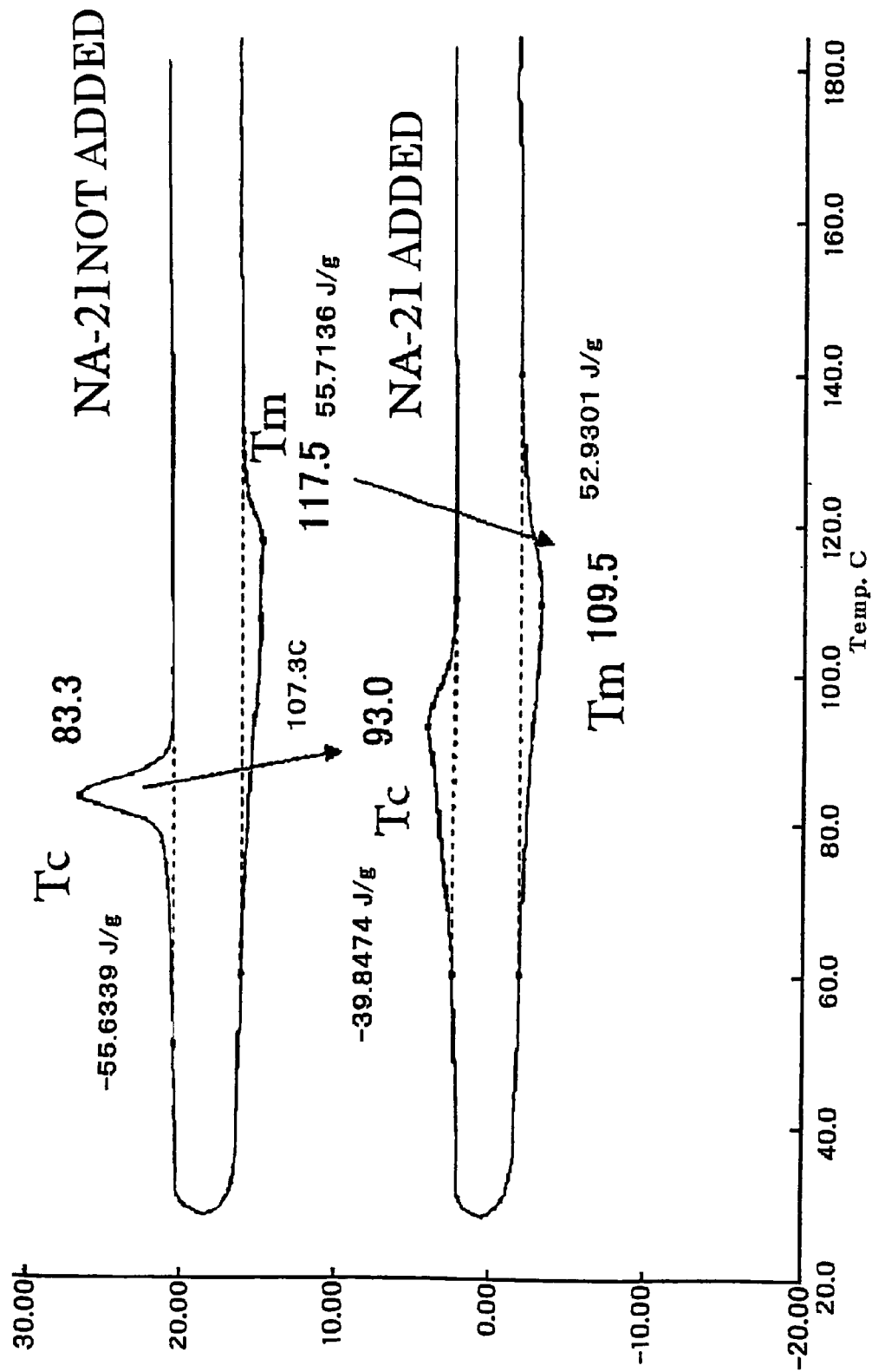

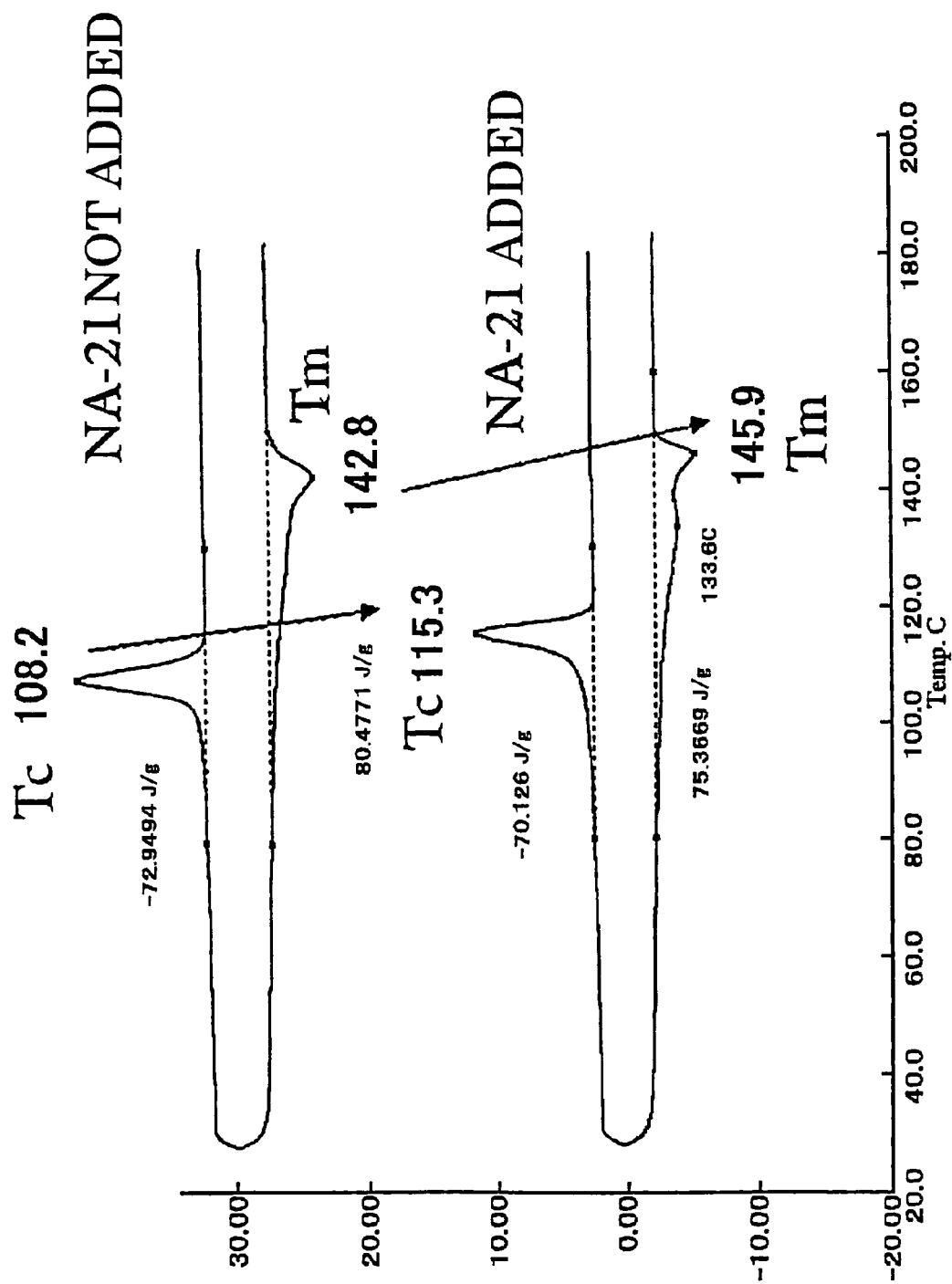
[Fig.2]

POLYPROPYLENE RESIN AND BLOW MOLDED CONTAINER

TECHNICAL FIELD

The present invention relates to polypropylene resins and blow molded containers. In more detail, the invention relates to polypropylene resins that are easily stretch blow molded or direct blow molded and are capable of forming containers excellent in transparency, impact resistance and flexibility. The invention also relates to blow molded containers, specifically stretch blow molded containers and direct blow molded containers obtained from the polypropylene resins.

BACKGROUND ART

PET resins and polycarbonate resins are typical materials for stretch blow molded articles and direct blow molded articles. However, these resins are heavy with a specific gravity of 1.2 or more, and are also unsuitable for the recent need of volume reduction and the international issue of preservation and consumption reduction of oil resources. Accordingly, new materials have been demanded.

Polypropylene resins are generally excellent in chemical properties, physical properties and forming properties and are inexpensive. They are therefore used in various applications including food containers and medical containers. However, the polypropylene resins themselves do not always satisfy desired transparency or mechanical strength. Accordingly, the resins are usually blended with nucleating agents to achieve improved transparency or mechanical strength.

For example, the transparency of propylene/ethylene copolymers is enhanced by adding a nucleating agent or increasing ethylene incorporation. However, increasing the ethylene content results in more extracts to cause various problems in the forming process. Further, nucleating agents added to general polypropylene resins do not provide clear transparency due to crystallinity.

Furthermore, polypropylene resins blended with conventional nucleating agents show a clear melting point and a narrow melting point range. As a result, moldability in stretch blow molding and direct blow molding is lowered and the production stability is deteriorated.

These problems are addressed in JP-A-2003-286377, JP-A-H11-255982 and JP-A-H10-152530. These documents aim to improve moldability by distributing melting points so that the material is characterized by having two different peaks of melting points. In these circumstances, there is a need for polypropylene resins that are easily blow molded and are capable of giving molded articles having excellent transparency, impact resistance and flexibility.
Patent Document 1: JP-A-2003-286377
Patent Document 2: JP-A-H11-255982
Patent Document 3: JP-A-H10-152530

DISCLOSURE OF THE INVENTION

Problems to be Solved by the Invention

The present invention aims to solve the problems in the background art as described hereinabove. It is therefore an object of the present invention to provide polypropylene resins that are easily stretch blow molded or direct blow molded and are capable of forming containers excellent in transparency, impact resistance and flexibility, and stretch blow molded containers and direct blow molded containers that are obtained from the polypropylene resins.

Means to Solve the Problems

A polypropylene resin (R-1) according to the present invention comprises a random polypropylene (P1) having MFR (ASTM D 1238, 230° C., 2.16 kg load) of 0.5 to 100 g/10 min and an ethylene content of 3.0 wt % to less than 7.0 wt %, (i) the resin containing the random polypropylene (P1) at not less than 80 wt %, (ii) the resin showing a broad DSC melting curve which has a single melting point peak and in which the maximum intensity peak temperature (Tm) is not more than 120° C. and the half-value width on a higher temperature side from the maximum intensity peak is not less than 20° C.

The polypropylene resin (R-1) of the present invention preferably comprises 0.1 to 0.5 part by weight of an organic phosphate metal salt nucleating agent (C-1) or a sorbitol nucleating agent (C-2) based on 100 parts by weight of the random polypropylene (P1) in the polypropylene resin.

Another aspect of the present invention is directed to a polypropylene resin (R-2) which comprises the random polypropylene (P1) and a homopolypropylene or a random polypropylene (P2) having a melting point (Tm) of more than 120° C. and not more than 150° C. and an ethylene content of 0 to 4.5 wt %, (i) the resin containing the random polypropylene (P1) and the homopolypropylene or random polypropylene (P2) combined at not less than 80 wt %, (ii) the proportion of the random polypropylene (P1) being 60 to 99 wt % and the proportion of the homopolypropylene or random polypropylene (P2) being 1 to 40 wt % based on 100 wt % of the total of (P1) and (P2), (iii) the polypropylene resin further comprising 0.1 to 0.5 part by weight of an organic phosphate metal salt nucleating agent (C-1) or a sorbitol nucleating agent (C-2) based on 100 parts by weight of (P1) and (P2) combined. The polypropylene resin (R-2) can be molded at a drastically increased range of temperatures as well as being capable of giving blow molded articles having excellent transparency, impact resistance and flexibility similar to the polypropylene resin (R-1).

The polypropylene resins (R-1) and (R-2) of the present invention are suitably used for the production of stretch blow molded containers or direct blow molded containers.

A stretch blow molded container or a direct blow molded container according to the present invention is produced by stretch blow molding or direct blow molding the polypropylene resin (R-1) or (R-2).

According to a preferred embodiment of the stretch blow molded containers of the present invention, the container is produced by stretch blow molding the polypropylene resin at a stretch ratio of not less than 1.5 both in the longitudinal and lateral directions and the container has a haze value of not more than 4%/mm per unit thickness as measured through a side face of the container in accordance with ASTM D 1003.

EFFECT OF THE INVENTION

The polypropylene resins of the present invention are easily stretch blow molded or direct blow molded and are capable of forming containers excellent in transparency, impact resistance and flexibility.

The polypropylene resins of the invention have a specific gravity of about 0.9, which corresponds to about 30% reduction compared to other resins conventionally used in stretch blow molding. Therefore, the stretch blow molded containers and direct blow molded containers obtained from the polypropylene resins are lightweight and show excellent flexibility whereby the containers can be easily squashed (squeezed) for disposal after use and the volume reduction is achieved.

BRIEF DESCRIPTION OF THE DRAWINGS

FIG. 1 shows DSC curves of resin compositions of Example 1 and Comparative Example 1.

FIG. 2 shows DSC curves of resin compositions of Comparative Examples 10 and 12.

BEST MODE FOR CARRYING OUT THE INVENTION

The polypropylene resins and use thereof according to the present invention will be described more specifically hereinbelow.

The polypropylene resins (R-1) according to the present invention contain a random polypropylene (P1). The polypropylene resins (R-2) of the invention contain a random polypropylene (P1) and a homopolypropylene or random polypropylene (P2).

[Random Polypropylenes (P1)]

The random polypropylene (P1) used in the present invention is a resin obtained from ethylene and propylene. It has a melt flow rate (MFR, ASTM D 1238, 230° C., 2.16 kg load, the same applies hereinafter) of 0.5 to 100 g/10 min, preferably 5.0 to 50 g/10 min, and more preferably 8.0 to 30 g/10 min, and an ethylene content of 3.0 wt % to less than 7.0 wt %, preferably 4.5 wt % to less than 7.0 wt %, and more preferably more than 5.0 wt % and less than 7.0 wt %. The ethylene content may be determined by $^{13}$C-NMR.

The melt flow rate and ethylene content in the above ranges lead to outstanding transparency, impact resistance and flexibility as a result of synergistic effects between flowability (moldability) of the obtainable polypropylene resin and a nucleating agent described later; further, the obtainable polypropylene resin can give stretch blow molded articles having good appearance.

[Homopolypropylenes or Random Polypropylenes (P2)]

The homopolypropylene or random polypropylene (P2) (hereinafter, the homopolypropylene and random polypropylene (P2) are sometimes collectively referred to as the polypropylene (P2)) has a melting point (Tm) of more than 120 and not more than 150° C., and preferably in the range of 124 to 150° C., and an ethylene content of 0 to 4.5 wt %, and preferably 0 to 4.0 wt %.

The polypropylene (P2) desirably has MFR of 0.5 to 100 g/10 min preferably 5.0 to 50 g/10 min, and more preferably 10 to 30 g/10 min.

The random polypropylenes (P1) and the polypropylenes (P2) may be generally produced with a metallocene catalyst that essentially contains a bridged metallocene compound represented by Formula (1) below:

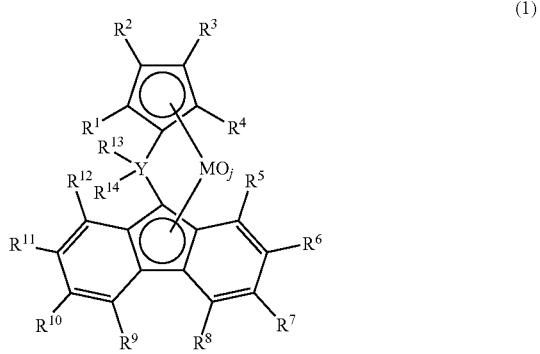

In Formula (1) above, $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are selected from a hydrogen atom, hydrocarbon groups and silicon-containing groups and may be the same or different from one another; M is a Group 4 transition metal; Y is a carbon atom or a silicon atom; Q is a halogen atom, a hydrocarbon group, an anionic ligand or a neutral ligand capable of coordination by lone pair electrons and may be the same or different when plural; and j is an integer of 1 to 4.

Preferred examples of the bridged metallocene compounds of Formula (1) include those in which $R^1$ and $R^3$ are each a C1-5 alkyl group, preferably a methyl group, an ethyl group or a tert-butyl group, $R^2$ and $R^4$ are hydrogen atoms, Y is a carbon atom, $R^{13}$ and $R^{14}$ are each a methyl group, a phenyl group or a nuclear-substituted phenyl group, and a pair of $R^6$ and $R^{11}$ and/or a pair of $R^7$ and $R^{10}$ are each a C1-10 alkyl group. Specific examples of such bridged metallocene compounds include isopropylidene(3-tert-butyl-5-methyl-cyclopentadienyl) (fluorenyl)zirconium dichloride, isopropylidene (3-tert-butyl-5-methyl-cyclopentadienyl) (3,6-di-tert-butylfluorenyl)zirconium dichloride, diphenylmethylene(3-tert-butyl-5-methyl-cyclopentadienyl) (fluorenyl)zirconium dichloride, diphenylmethylene(3-tert-butyl-5-methyl-cyclopentadienyl) (2,7-di-tert-butylfluorenyl)zirconium dichloride, diphenylmethylene(3-tert-butyl-5-methyl-cyclopentadienyl) (3,6-di-tert-butylfluorenyl)zirconium dichloride, isopropylidene(3-tert-butyl-5-methylcyclopentadienyl) (octamethyloctahydrodibenzofluorenyl)zirconium dichloride, isopropylidene(3-tert-butyl-5-ethylcyclopentadienyl) (octamethyloctahydrodibenzofluorenyl)zirconium dichloride, diphenylmethylene(3-tert-butyl-5-ethylcyclopentadienyl) (fluorenyl)zirconium dichloride, phenylmethylmethylene (3-tert-butyl-5-ethylcyclopentadienyl) (octamethyloctahydrodibenzofluorenyl)zirconium dichloride and phenylmethylmethylene (3-tert-butyl-5-methylcyclopentadienyl) (octamethyloctahydrodibenzofluorenyl)zirconium dichloride.

The metallocene catalyst comprises:
(a) the bridged metallocene compound represented by Formula (1) above;
(b) at least one compound selected from:
(b-1) organometallic compounds;
(b-2) organoaluminum oxy-compounds; and
(b-3) compounds capable of reacting with the metallocene compound to form an ion pair; and optionally
(c) a particulate carrier.

Examples of the components (a), (b) and (c) may be found in WO 2005/019283 pamphlet filed by the present applicant, and those components described therein may be used without limitation.

The random polypropylenes (P1) and the polypropylenes (P2) of the present invention may be generally produced using the metallocene catalysts as described above. However, the polymerization catalysts, the production processes and the coexistence of olefin polymers other than the random polypropylenes (P1) and the polypropylenes (P2) are not particularly limited as long as the random polypropylenes (P1) and the polypropylenes (P2) satisfy the requirements described hereinabove.

[Nucleating Agents]

Examples of the organic phosphate metal salt nucleating agents (C-1) for use in the present invention include nucleating agents mainly composed of cyclic organic phosphate metal salts represented by Formula (2) or (3) below:

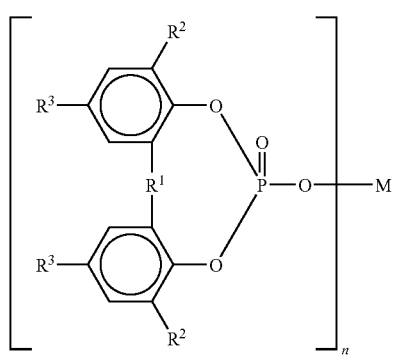

(2)

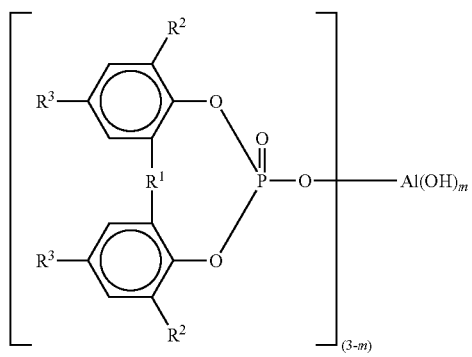

(3)

In Formulae (2) and (3), $R^1$ is a C1-10 divalent hydrocarbon group such as methylene, ethylene or propylene.

$R^2$ and $R^3$ are each a hydrogen atom or a C1-10 monovalent hydrocarbon group such as methyl, ethyl, propyl, isopropyl, butyl, isobutyl, tert-butyl, amyl, tert-amyl, hexyl, heptyl, octyl, nonyl or 2-ethylhexyl, and may be the same or different from each other.

M in Formula (2) is a monovalent to trivalent metal atom such as sodium, lithium, calcium, magnesium, barium or aluminum.

The letter n in Formula (2) is an integer of 1 to 3 and satisfies the valence of the metal M.

The letter m in Formula (3) is 1 or 2.

Examples of the cyclic organic phosphate metal salts represented by Formula (2) or (3) include sodium-2,2'-methylene-bis(4,6-di-tert-butylphenyl) phosphate, sodium-2,2'-ethylidene-bis(4,6-di-tert-butylphenyl) phosphate, lithium-2,2'-methylene-bis(4,6-di-tert-butylphenyl) phosphate, lithium-2,2'-ethylidene-bis(4,6-di-tert-butylphenyl) phosphate, sodium-2,2'-ethylidene-bis(4-isopropyl-6-tert-butylphenyl) phosphate, lithium-2,2'-methylene-bis(4-methyl-6-tert-butylphenyl) phosphate, lithium-2,2'-methylene-bis(4-ethyl-6-tert-butylphenyl) phosphate, calcium-bis[2,2'-thiobis(4-methyl-6-tert-butylphenyl) phosphate], calcium-bis[2,2'-thiobis(4-ethyl-6-tert-butylphenyl) phosphate], calcium-bis[2,2'-thiobis(4,6-di-tert-butylphenyl) phosphate], magnesium-bis[2,2'-thiobis(4,6-di-tert-butylphenyl) phosphate], magnesium-bis[2,2'-thiobis(4-tert-octylphenyl) phosphate], sodium-2,2'-butylidene-bis(4,6-dimethylphenyl) phosphate, sodium-2,2'-butylidene-bis(4,6-di-tert-butylphenyl) phosphate, sodium-2,2'-tert-octylmethylene-bis(4,6-dimethylphenyl) phosphate, sodium-2,2'-tert-octylmethylene-bis(4,6-di-tert-butylphenyl) phosphate, calcium-bis[2,2'-methylene-bis(4,6-di-tert-butylphenyl) phosphate], magnesium-bis[2,2'-methylene-bis(4,6-di-tert-butylphenyl) phosphate], barium-bis[2,2'-methylene-bis(4,6-di-tert-butylphenyl) phosphate], sodium-2,2'-methylene-bis(4-methyl-6-tert-butylphenyl) phosphate, sodium-2,2'-methylene-bis(4-ethyl-6-tert-butylphenyl) phosphate, sodium(4,4'-dimethyl-5,6'-di-tert-butyl-2,2'-biphenyl) phosphate, calcium-bis [(4,4'-dimethyl-6,6'-di-tert-butyl-2,2'-biphenyl) phosphate], sodium-2,2'-ethylidene-bis(4-m-butyl-6-tert-butylphenyl) phosphate, sodium-2,2'-methylene-bis(4,6-dimethylphenyl) phosphate, sodium-2,2'-methylene-bis(4,6-diethylphenyl) phosphate, potassium-2,2'-ethylidene-bis(4,6-di-tert-butylphenyl) phosphate, calcium-bis[2,2'-ethylidene-bis(4,6-di-tert-butylphenyl) phosphate], magnesium-bis[2,2'-ethylidene-bis(4,6-di-tert-butylphenyl) phosphate], barium-bis[2,2'-ethylidene-bis(4,6-di-tert-butylphenyl) phosphate], aluminum-tris[2,2'-methylene-bis(4,6-di-tert-butylphenyl) phosphate], aluminum-tris[2,2'-ethylidene-bis(4,6-di-tert-butylphenyl) phosphate] and mixtures containing two or more of these salts.

Preferred nucleating agents are mainly composed of the cyclic organic phosphate metal salts (C-1) of Formula (3) in which $R^1$ is a methylene group, $R^2$ and $R^3$ are both tert-butyl groups and m is 1, as illustrated below by Formula (4):

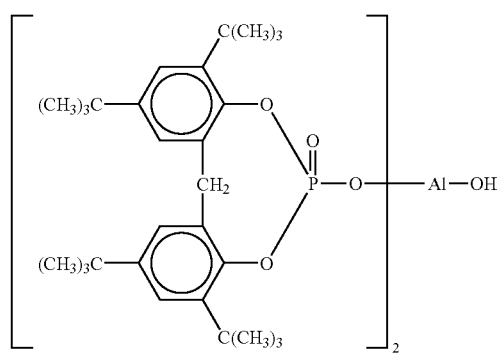

(4)

Examples of the sorbitol nucleating agents (C-2) for use in the present invention include nucleating agents mainly composed of compounds represented by Formula (5) below:

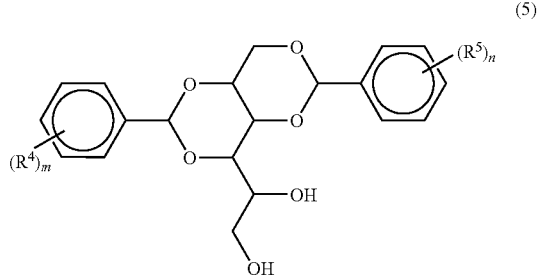

(5)

In Formula (5), $R^4$ and $R^5$ may be the same or different from each other and are each a C1-8 alkyl group, a halogen atom or a C1-4 alkoxy group, and m and n are each an integer of 0 to 3.

Specific examples include 1,3,2,4-dibenzylidene sorbitol, 1,3-benzylidene-2,4-p-methylbenzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4-di(p-methylbenzylidene) sorbitol, 1,3,2,4-di(p-ethylbenzylidene) sorbitol, 1,3,2,4-di(p-n-propylbenzylidene) sorbitol, 1,3,2,4-di(p-isopropylbenzylidene) sorbitol, 1,3,2,4-di(p-n-butylbenzylidene) sorbitol, 1,3,2,4-di(p-s-butylbenzylidene) sorbitol, 1,3,2,4-di(p-tert-butylbenzylidene) sorbitol, 1,3,2,4-di (2', 4'-dimethylbenzylidene) sorbitol, 1,3,2,4-di(p-methoxybenzylidene) sorbitol, 1,3,2,4-di(p-ethoxybenzylidene) sorbitol, 1,3-benzylidene-2-4-p-chlorobenzylidene sorbitol, 1,3-p-chlorobenzylidene-2,4-benzylidene sorbitol, 1,3-p-chlorobenzylidene-2,4-p-methylbenzylidene sorbitol, 1,3-p-chlorobenzylidene-2,4-p-ethylbenzylidene sorbitol, 1,3-p-methylbenzylidene-2,4-p-chlorobenzylidene sorbitol, 1,3-p-ethylbenzylidene-2,4-p-chlorobenzylidene sorbitol, 1,3,2,4-di(p-chlorobenzylidene) sorbitol, and mixtures containing two or more of these sorbitols. In particular, 1,3,2,4-dibenzylidene sorbitol, 1,3,2,4-di (p-methylbenzylidene) sorbitol, 1,3,2,4-di(p-ethylbenzylidene) sorbitol, 1,3-p-chlorobenzylidene-2,4-p-methylbenzylidene sorbitol, 1,3,2,4-di(p-chlorobenzylidene) sorbitol, and mixtures containing two or more of these sorbitols are preferred.

The usage amount of the nucleating agents is 0.1 to 0.5 part by weight, and preferably 0.15 to 0.35 part by weight based on 100 parts by weight of the random polypropylene (P1) in the resin (R-1) or the random polypropylene (P1) and the homopolypropylene or random polypropylene (P2) in the resin (R-2).

To assist dispersion of the nucleating agents, fatty acid metal salts or lubricants may be generally used as dispersing agents. In the present invention, dispersing agents and lubricants that do not adversely affect the objects of the invention may be used.

The polypropylene resins according to the present invention may contain phosphorous antioxidants or neutralizers described below as required.

[Phosphorous Antioxidants]

The phosphorous antioxidants suitably used in the present invention as required are not particularly limited, and known phosphorous antioxidants may be used. It is preferable that a single phosphorous antioxidant is used because of little contamination of contents by bleeding.

Preferred examples of the phosphorous antioxidants of the present invention include trivalent organophosphorus compounds such as tris(2,4-di-tert-butylphenyl) phosphite, 2,2-methylene-bis(4,6-di-tert-butylphenyl)octyl phosphite and bis(2,6-di-tert-butyl-4-methylphenyl)pentaerythritol diphosphite.

The usage amount of the phosphorous antioxidants is generally 0.02 to 0.20 part by weight, preferably 0.03 to 0.08 part by weight, and more preferably 0.04 to 0.06 part by weight based on 100 parts by weight of the resin component(s).

[Neutralizers]

The neutralizers optionally used together with the phosphorous antioxidants in the present invention may be conventional neutralizers such as calcium stearate and hydrotalcite.

Because the synthesis of the polypropylene with the metallocene catalyst does not cause hydrochloric acid originating from the catalyst, the usage amount of the neutralizers in this case is generally 0.02 to 0.20 part by weight, preferably 0.03 to 0.08 part by weight, and more preferably 0.04 to 0.06 part by weight based on 100 parts by weight of the resin component(s).

[Polypropylene Resins (R-1) and (R-2)]

The polypropylene resin (R-1) of the present invention contains the random polypropylene (P1) and shows a broad DSC melting curve which has a single melting point peak and in which the maximum intensity peak temperature (Tm) is not more than 120° C., and preferably not more than 115° C., and the half-value width on a higher temperature side from the maximum intensity peak (the half-value width from the maximum intensity peak that is found on a higher temperature side than the maximum intensity peak temperature) is not less than 20° C., preferably not less than 22° C., and more preferably not less than 25° C.

The polypropylene resin (R-1) of the present invention may contain additional components other than the random polypropylene (P1) as long as the polypropylene resin (R-1) satisfies the requirements as described above. In such cases, the polypropylene resin (R-1) contains the random polypropylene (P1) at not less than 80 wt %, preferably not less than 90 wt %, more preferably not less than 95 wt %, and particularly preferably not less than 97 wt %. The additional components include various additives used in the polyolefin molding such as nucleating agents, antioxidants and neutralizers.

The polypropylene resin (R-2) of the present invention contains the random polypropylene (P1) and the polypropylene (P2). The proportion of the random polypropylene (P1) is 60 to 99 wt %, and preferably 60 to 95 wt %, and the proportion of the polypropylene (P2) is 1 to 40 wt %, and preferably 5 to 40 wt % based on 100 wt % of the total of (P1) and (P2).

The polypropylene resin (R-2) of the present invention contains the nucleating agents in an amount of 0.1 to 0.5 part by weight, and preferably 0.15 to 0.35 part by weight based on 100 parts by weight of (P1) and (P2) combined.

The polypropylene resin (R-2) of the present invention may contain additional components other than the random polypropylene (P1) and the polypropylene (P2). In such cases, the polypropylene resin (R-2) contains the random polypropylene (P1) and the polypropylene (P2) combined at not less than 80 wt %, preferably not less than 90 wt %, and more preferably not less than 95 wt %. The additional components are as described hereinabove.

The polypropylene resin (R-1) of the present invention may be obtained by mixing the random polypropylene (P1) optionally together with other components such as the nucleating agents, phosphorous antioxidants and neutralizers in a Henschel mixer, a V-type blender, a tumbler blender or a ribbon blender, and melt kneading the resultant blend with a single-screw extruder, a multi-screw extruder, a kneader or a Banbury mixer, whereby the components are uniformly mixed and dispersed.

The polypropylene resin (R-2) of the present invention may be obtained by mixing the random polypropylene (P1), the polypropylene (P2) and the nucleating agent optionally together with other components such as the phosphorous antioxidants and neutralizers in a Henschel mixer, a V-type blender, a tumbler blender or a ribbon blender, and melt kneading the resultant blend with a single-screw extruder, a multi-screw extruder, a kneader or a Banbury mixer, whereby the components are uniformly mixed and dispersed.

Blow molded articles formed from the polypropylene resins (R-1) and (R-2) of the present invention have improved transparency, high impact resistance and squeezability required for volume reduction. In particular, the polypropylene resins (R-2) have an excellent property that can be molded at a wider range of molding temperatures.

[Stretch Blow Molded Containers]

The stretch blow molded containers of the present invention may be manufactured as follows. The polypropylene resin (R-1) or (R-2) is molten and is injected into a mold to form a preform. While the preform is in a molten or softened state or after it is hardened and then reheated, the preform is forcibly stretched in the longitudinal direction with a stretching rod or the like and thereafter a pressurizing fluid is blown into the preform whereby the preform is further stretched in the longitudinal and lateral directions and forms a stretch blow molded container.

The polypropylene resin (R-1) or (R-2) is usually molten and injected at temperatures of 200 to 280° C. The preform temperature immediately before the stretching is approximately 110 to 150° C. The stretch ratio is generally 1.5 to 4.0 in the longitudinal direction and 1.5 to 3.0 in the lateral direction.

[Direct Blow Molded Containers]

In the direct blow molding, the polypropylene resin (R-1) or (R-2) is extruded through a ring die into a hollow pipe. While the parison is still molten, it is clamped between blow molds and a fluid is blown into the parison to mold the parison into a predetermined shape.

The polypropylene resins (R-1) and (R-2) of the present invention show excellent stretchability in stretch molding at a wide range of stretching temperatures and produce stretch blow molded containers or direct blow molded containers having a substantially uniform thickness. The polypropylene resins of the present invention possess high transparency and rigidity, and therefore the stretch blow molded containers and direct blow molded containers therefrom achieve excellent transparency and rigidity.

The stretch blow molded containers and direct blow molded containers of the present invention are burnt easily and have high food sanitation properties. They are accordingly suited for use as containers for food, seasonings, drinking water and cosmetics etc.

EXAMPLES

The present invention will be described based on Examples hereinbelow without limiting the scope of the invention.

In Examples, properties were measured by the following methods.

(1) Haze

The haze was measured in accordance with ASTM D 1003 with respect to injection molded sheets 2 mm in thickness.

The haze of bottles was also evaluated. A sample was cut out from an approximately central part of a bottle side face and the haze therethrough was measured in accordance with ASTM D 1003.

(2) Flexural Modulus

A flexural test was carried out in accordance with ASTM D 790, and the flexural modulus was calculated from the results.

(3) Izod Impact Strength

An Izod test was carried out in accordance with ASTM D 256.

(4) Melting Point Confirmation (DSC)

A sample weighing 5 mg was placed into a nitrogen-purged measurement container fitted in a differential scanning calorimeter (DSC) and was molten at 240° C. The sample was then cooled to 30° C. at a rate of 10° C./min and was held at 30° C. for 5 minutes. The sample was heated at a rate of 10° C./min, and a melting curve showing the melting point and neighboring temperatures was obtained.

By the expression that a melting curve is broad, it is meant that the curve does not have two or more peaks between the melting initiation temperature (Ti) and the melting finish temperature (Tf) and does not have a shoulder. If a melting curve has two or more peaks between Ti and Tf and/or has a shoulder, the curve is defined to be non-broad. The heat of fusion ($\Delta H$) is usually 10 to 70 (J/g), and preferably 20 to 60 (J/g) wherein the heat of fusion is determined based on an area within the broad melting curve and a baseline (a straight line connecting Ti and Tf). A single peak temperature indicating the maximum intensity between the temperatures (Ti) and (Tf) was defined to be the melting point (Tm). The half-value width ($\Delta T$) on a higher temperature side from the maximum intensity peak was read from the chart in accordance with the following equation (Eq-1):

$$\Delta T = Tf - Tm \quad (Eq\text{-}1)$$

(5) Heat Distortion Temperature

The heat distortion temperature was measured in accordance with ASTM D 648.

(6) High-Speed Surface Impact Test (High-Rate Test)

An impact shaft which was ½ inch in tip diameter and was fitted with a load cell was bombarded with a 2 mm thick square sample at a speed of 3 m/sec. At the back of the sample was a pad that was 3 inches in tip diameter (receiver diameter). The total absorbed energy that the sample absorbed until breakage was determined. Stretch blow molded bottles were tested at an impact speed of 1 m/sec in consideration of their small thickness of 0.8 mm. Samples were cut out from an approximately central part of the bottle side face.

Production Example 1

Preparation of Silica-Supported Methylaluminoxane

A thoroughly nitrogen-purged 500 ml reactor was charged with 20 g of silica and 200 ml of toluene, and 60 ml of methylaluminoxane was added dropwise with stirring in the nitrogen atmosphere. The mixture was reacted at 110° C. for 4 hours, and the reaction system was allowed to cool and thereby a solid was precipitated. The supernatant liquid was removed by decantation. The solid was washed three times with toluene and three times with hexane. A silica-supported methylaluminoxane was thus obtained.

[Preparation of Metallocene Catalyst]

A thoroughly nitrogen-purged 1000 ml two-necked flask was charged with 20 mmol in terms of aluminum atom of the silica-supported methylaluminoxane. The silica-supported methylaluminoxane was suspended in 500 ml of heptane. To the suspension, a toluene-solution containing 70 mg of diphenylmethylene(3-tert-butyl-5-methylcyclopentadienyl) (2,7-di-tert-butylfluorenyl)zirconium dichloride was added. Further, triisobutylaluminum (80 mmol) was added, and the mixture was stirred for 30 minutes to give a metallocene catalyst suspension.

[Production of Random Polypropylene]

The metallocene catalyst suspension as described above was placed in a thoroughly nitrogen-purged 200 L autoclave, and 300 L of liquid propylene and 2.2 kg of ethylene were injected into the autoclave. Further, 10 L of hydrogen was added. Polymerization was performed at 60° C. and a pressure of 3.0 to 3.5 MPa for 60 minutes. When the polymerization ended, methanol was added to terminate the polymerization and the autoclave was purged of unreacted propylene. An ethylene/propylene copolymer (PP-1) was thus obtained. The copolymer was vacuum dried at 80° C. for 6 hours. The ethylene/propylene copolymer (PP-1) had MFR of 23 g/10 min and an ethylene content of 5.3 wt %.

Production Example 2

A propylene/ethylene copolymer (PP-2) was produced in the same manner as in Production Example 1 except that the ethylene amount and the hydrogen amount were changed to 2.0 kg and 5 L, respectively. The ethylene/propylene-copolymer (PP-2) had MFR of 7.9 g/10 min and an ethylene content of 4.8 wt %.

Production Example 3

A propylene/ethylene copolymer (PP-3) was produced in the same manner as in Production Example 1 except that the ethylene amount was changed to 1.7 kg. The ethylene/propylene copolymer (PP-3) had MFR of 21 g/10 min and an ethylene content of 4.0 wt %.

Production Example 4

A propylene/ethylene copolymer (PP-4) was produced in the same manner as in Production Example 1 except that the ethylene amount was changed to 0.65 kg. The propylene/ethylene copolymer (PP-4) had MFR of 20 g/10 min and an ethylene content of 1.5 wt %.

Production Example 5

Production of Metallocene Catalyst and Homopolypropylene

A thoroughly nitrogen-purged 20 L autoclave was charged with 20 mmol in terms of aluminum atom of silica-supported methylaluminoxane. The silica-supported methylaluminoxane was suspended in 500 ml of heptane. To the suspension, a toluene solution containing 54 mg (0.088 mmol) of dimethylmethylene(3-tert-butyl-5-methylcyclopentadienyl) (3,6-di-tert-butylfluorenyl)zirconium dichloride was added. Further, triisobutylaluminum (80 mmol) was added, and the mixture was stirred for 30 minutes to give a catalyst suspension.

A thoroughly nitrogen-purged 20 L autoclave was charged with 5 kg of propylene and 1.5 L of hydrogen, and the above-described catalyst suspension was added to the autoclave. Bulk homopolymerization was performed at 70° C. and a pressure of 3.0 to 3.5 MPa for 60 minutes, and was terminated by adding a small amount of methanol. The autoclave was purged of unreacted gas.

The resultant propylene homopolymer weighed 2.8 kg. The polymer had a melting point (Tm) of 159° C. The stereoregularity provided a mmmm fraction of 97.0%, and 2,1- or 1,3-insertion was not detected. The propylene homopolymer (PP-5) had MFR of 21 g/10 min.

Production Example 6

Preparation of Solid Titanium Catalyst Component (a)

952 g of anhydrous magnesium chloride, 4420 ml of decane and 3906 g of 2-ethylhexyl alcohol were heated at 130° C. for 2 hours to give a homogeneous solution. To the solution, 213 g of phthalic anhydride was added and dissolved therein by stirring at 130° C. for 1 hour.

The resultant homogeneous solution was cooled to 23° C., and 750 ml of the homogeneous solution was added dropwise over a period of 1 hour to 2000 ml of titanium tetrachloride maintained at −20° C. After the dropwise addition, the liquid mixture was heated to 110° C. in 4 hours. When the temperature reached 110° C., 52.2 g of diisobutyl phthalate (DIBP) was added. The mixture was held at the temperature with stirring for 2 hours. The mixture was hot filtered to collect the solid, and the solid was resuspended in 2750 ml of titanium tetrachloride. The suspension was heated at 110° C. for 2 hours.

After the heating, the suspension was hot filtered to collect the solid, and the solid was washed with decane and hexane at 110° C. until no titanium compounds were detected in the washings.

The solid titanium catalyst component (a) prepared as described above was stored as a hexane slurry. Part of the slurry was dried and analyzed to determine the catalyst composition. The solid titanium catalyst component (a) was found to contain 3 wt % of titanium, 58 wt % of chlorine, 18 wt % of magnesium and 21 wt % of DIBP.

[Preparation of Prepolymerized Catalyst]

A 200 L autoclave equipped with a stirrer was charged in a nitrogen atmosphere with 140 L of purified heptane, 0.28 mol of triethylaluminum and 0.094 mol in terms of titanium atom of the solid titanium catalyst component (a). Further, 1350 g of propylene was fed, and reaction was performed for 1 hour while keeping the temperature at not more than 20° C.

After the completion of the polymerization, the reactor was purged with nitrogen and the supernatant liquid was removed. The product was washed with purified heptane three times. The resultant prepolymerized catalyst was resuspended in purified heptane and was transferred to a catalyst supply tank. The concentration of the solid titanium catalyst component (a) was adjusted to 1.5 g/L with purified heptane. The prepolymerized catalyst contained 6 g of polypropylene per 1 g of the solid titanium catalyst component (a).

[Production of Propylene Homopolymer]

A 500 L polymerization vessel equipped with a stirrer was charged with 300 L of liquid propylene. While the liquid level was maintained constant, 130 kg/h of liquid propylene, 1.5 g/h of the prepolymerized catalyst, 38 mmol/h of triethylaluminum and 6.3 mmol/h of dicyclopentyldimethoxysilane were continuously fed, and polymerization was carried out at 75° C. Hydrogen was also supplied at 230 NL/h. The slurry obtained was deactivated and was transferred to a washing tank where the polypropylene powder was washed with liquid propylene. The propylene was evaporated, and a powdery propylene homopolymer (PP-6) was obtained. The obtained propylene homopolymer (PP-6) had MFR of 22 g/10 min.

Production Example 7

A 500 L polymerization vessel equipped with a stirrer was charged with 300 L of liquid propylene. While the liquid level was maintained constant, 110 kg/h of liquid propylene, 2.5 g/h of the prepolymerized catalyst as described in Production Example 6, 50 mmol/h of triethylaluminum and 50 mmol/h of cyclohexylmethyldimethoxysilane were continuously fed, and polymerization was carried out at 65° C. Hydrogen was also supplied continuously at 550 NL/h, and ethylene was supplied such that the ethylene concentration in the gas phase in the polymerization vessel would be 1.5 mol %. The slurry obtained was deactivated and was transferred to a washing tank where the polypropylene powder was washed with liquid propylene. The propylene was evaporated, and a powdery propylene/ethylene copolymer (PP-7) was obtained. The propylene/ethylene copolymer (PP-7) had MFR of 17 g/10 min and an ethylene content of 3.8 wt %.

Production Example 8

Production of Homopolypropylene

A thoroughly nitrogen-purged 200 L autoclave was charged with the metallocene catalyst suspension prepared in Production Example 1, and 300 L of liquid propylene was injected with pressure. Subsequently, 10 L of hydrogen was added, and polymerization was carried out at 60° C. and a pressure of 3.0 to 3.5 MPa for 60 minutes. When the polymerization ended, methanol was added to terminate the polymerization and the autoclave was purged of unreacted propylene. The product was vacuum dried at 80° C. for 6 hours.

The propylene homopolymer (PP-8) obtained had MFR of 22 g/10 min and a melting point (Tm) of 146° C.

Example 1

Production of Polypropylene Resin

There were mixed in a Henschel mixer 100 parts by weight of the propylene/ethylene polymer (PP-1) obtained in Production Example 1, 0.25 part by weight of nucleating agent NA-21 (trade name) manufactured by ADEKA CORPORATION, tris(2,4-di-tert-butylphenyl) phosphite, 0.10 part by weight of 2,2-methylene-bis(4,6-di-tert-butylphenyl)octyl phosphite (trade name: IRGAFOS 168 manufactured by Ciba Specialty Chemicals), 0.10 part by weight of tetrakis [methylene-3-(3', 5'-di-tert-butyl-4'-hydroxyphenyl) propionate] methane (trade name: IRGANOX 1010 manufactured by Ciba Specialty Chemicals) and 0.05 part by weight of calcium stearate. The mixture was kneaded in a twin-screw extruder (65 mm diameter) at 200° C. and a screw rotation of 200 rpm to give polypropylene resin pellets. Table 1 sets forth the MFR, melting point and melting point width of the polypropylene resin. A DSC curve of the polypropylene resin is shown in FIG. 1.
[Manufacturing of Stretch Blow Molded Containers]

The polypropylene resin composition was injection stretch blow molded with an injection stretch blow molding apparatus (PF6-2B manufactured by NISSEI ASB MACHINE CO., LTD.) to produce a 200 ml PET bottle shaped container having a body portion thickness of 0.8 mm.

Specifically, the polypropylene resin composition was molten at a resin temperature of 200° C. in the injection molding apparatus and was injected into a first mold that was temperature-controlled at 15° C. with a water circulation loop attached to the molding apparatus, whereby a preform was formed. Subsequently, the preform was transferred to a preheating zone . . . and was heated with an infrared heater, and then air was preliminarily blown thereinto. Immediately thereafter, the preform was stretched in the longitudinal and lateral directions with a stretching rod and blowing air with a stretch ratio of 2.0 in the longitudinal direction and a stretch ratio of about 1.5 in the lateral direction. The bottle was cooled, hardened to match a blow mold and then ejected. The lower and upper limits of the preform surface temperatures which were reached by the preheating and at which the preform was successfully blow molded were obtained as a molding temperature width.

Example 2

A stretch blow molded container was manufactured in the same manner as in Example 1 except that ADEKA CORPORATION's NA-21 was replaced by a sorbitol nucleating agent (trade name: GEL ALL MD manufactured by New Japan Chemical Co., Ltd.).

Comparative Example 1

A stretch blow molded container was manufactured in the same manner as in Example 1 except that ADEKA CORPORATION's NA-21 was not used. A DSC curve of the polypropylene resin is shown in FIG. 1.

Example 3

A stretch blow molded container was manufactured in the same manner as in Example 1 except that ADEKA CORPORATION's NA-21 was replaced by NA-11UY manufactured by ADEKA CORPORATION.

Example 4

A stretch blow molded container was manufactured in the same manner as in Example 1 except that the propylene/ethylene polymer (PP-1) was replaced by the propylene/ethylene polymer (PP-2) obtained in Production Example 2.

Comparative Example 2

A stretch blow molded container was manufactured in the same manner as in Example 4 except that ADEKA CORPORATION's NA-21 was not used.

Example 5

A stretch blow molded container was manufactured in the same manner as in Example 1 except that the propylene/ethylene polymer (PP-1) was replaced by the propylene/ethylene polymer (PP-3) obtained in Production Example 3.

Comparative Example 3

A stretch blow molded container was manufactured in the same manner as in Example 5 except that ADEKA CORPORATION's NA-21 was not used.

Comparative Example 4 to Comparative Example 12

The procedures of Example 1 were repeated except that the propylene resins and optionally nucleating agents described in Tables 2 and 3 were used. DSC curves of the polypropylene resins obtained in Comparative Examples 10 and 12 are shown in FIG. 2.

Example 6

A stretch blow molded container was manufactured in the same manner as in Example 1 except that 100 parts by weight of the propylene/ethylene polymer (PP-1) was replaced by 70 parts by weight of the propylene/ethylene polymer (PP-1) and 30 parts by weight of the propylene homopolymer (PP-8) obtained in Production Example 8.

Example 7

A stretch blow molded container was manufactured in the same manner as in Example 1 except that 100 parts by weight of the propylene/ethylene polymer (PP-1) was replaced by 90 parts by weight of the propylene/ethylene polymer (PP-1) and 10 parts by weight of the propylene homopolymer (PP-8) obtained in Production Example 8.

Example 8

A stretch blow molded container was manufactured in the same manner as in Example 1 except that 100 parts by weight of the propylene/ethylene polymer (PP-1) was replaced by 70 parts by weight of the propylene/ethylene polymer (PP-1) and 30 parts by weight of the propylene homopolymer (PP-3) obtained in Production Example 3.

The results are shown in Tables 1 to 4.

TABLE 1

|  |  |  | Ex. 1 | Ex. 2 | Comp. Ex. 1 | Ex. 3 | Ex. 4 | Comp. Ex. 2 |
|---|---|---|---|---|---|---|---|---|
| Propylene resin |  |  | PP-1 |  |  |  | PP-2 |  |
| Nucleating agent/amount | — | phr | NA-21/0.2 | MD/0.2 | — | NA-11/0.1 | NA-21/0.2 | — |
| MFR |  | g/10 min | 23 | 24 | 24 | 24 | 8.5 | 8.2 |
| C2 content |  | wt % | 5.3 |  |  |  | 4.8 |  |
| Melting curve configuration | DSC | — | Broad | Broad | Non-broad | Broad | Broad | Non-broad |
| Tm | DSC | ° C. | 109.5 | 110.0 | 117.5 | 108.8 | 108.5 | 116.5 |
| Half-value width on higher temperature side from Tm | DSC | ° C. | 30.5 | 31.1 | 22.5 | 31.2 | 27.5 | 20.5 |
| Flexural modulus |  | MPa | 510 | 510 | 520 | 530 | 520 | 540 |
| Izod impact value | 23° C. | J/m | 237 | 239 | 115 | 112 | 200 | 108 |
| Heat distortion temperature | 0.45 MPa | ° C. | 65 | 63 | 69 | 68 | 66 | 70 |
| Haze | 2 mm thickness | % | 14 | 12 | 36 | 40 | 16 | 42 |
| High-rate impact strength, 23° C., 3 m/sec | Total absorbed energy | J | 17 | 17 | 17 | 17 | 17 | 17 |
| High-rate impact strength, 5° C., 3 m/sec | Total absorbed energy | J | 20 | 20 | 21 | 18 | 20 | 20 |
| High-rate impact strength on stretch blow molded bottle side face (0.8 mm), 23° C., 1 m/sec | Total absorbed energy | J | 6 | 6 | 6 | 5 | 6 | 5 |
| Haze through side surface of stretch blow molded bottle |  | % | 2 | 2 | 4 | 4 | 2 | 5 |
| Stretch blow molding temperature width | Surface temperature width | ° C. | 6 | 6 | 3 | 4 | 6 | 3 |

TABLE 2

|  |  |  | Ex. 5 | Comp. Ex. 3 | Comp. Ex. 4 | Comp. Ex. 5 | Comp. Ex. 6 | Comp. Ex. 7 |
|---|---|---|---|---|---|---|---|---|
| Propylene resin |  |  | PP-3 |  | PP-4 |  | PP-5 |  |
| Nucleating agent/amount | — | phr | NA-21/0.2 | — | — | NA-21/0.2 | — | NA-21/0.2 |
| MFR |  | g/10 min | 25 | 23 | 21 | 22 | 22 | 24 |
| C2 content |  | wt % | 4.0 |  | 1.5 |  | 0 |  |
| Melting curve configuration | DSC | — | Broad | Non-broad | Non-broad | Non-broad | Non-broad | Non-broad |
| Tm | DSC | ° C. | 118.6 | 124.4 | 136.6 | 141.0 | 161.7 | 162.5 |
| Half-value width on higher temperature side from Tm | DSC | ° C. | 22.0 | 12.3 | 10.5 | 6.4 | 4.3 | 2.7 |
| Flexural modulus |  | MPa | 650 | 740 | 1080 | 1380 | 1800 | 2060 |
| Izod impact value | 23° C. | J/m | 79 | 61 | 44 | 37 | 29 | 29 |
| Heat distortion temperature | 0.45 MPa | ° C. | 74 | 80 | 98 | 102 | 127 | 134 |
| Haze | 2 mm thickness | % | 18 | 68 | 72 | 21 | 86 | 52 |
| High-rate impact strength, 23° C., 3 m/sec | Total absorbed energy | J | 19 | 19 | 0.5 | 0.6 | 0.5 | 0.3 |
| High-rate impact strength, 5° C., 3 m/sec | Total absorbed energy | J | 8 | 8 | 0.2 | 0.2 | 0.2 | 0.2 |
| High-rate impact strength on stretch blow molded bottle side face (0.8 mm), 23° C., 1 m/sec | Total absorbed energy | J | 4 | Not measured due to molding failure | Not measured due to molding failure |  | Not measured due to molding failure |  |
| Haze through side surface of stretch blow molded bottle |  | % | 2 |  |  |  |  |  |
| Stretch blow molding temperature width | Surface temperature width | ° C. | 3 | Impossible | Impossible | Impossible | Impossible | Impossible |

TABLE 3

|  |  |  | Comp. Ex. 8 | Comp. Ex. 9 | Comp. Ex. 10 | Comp. Ex. 11 | Comp. Ex. 12 |
|---|---|---|---|---|---|---|---|
| Propylene resin |  |  | PP-6 | | | PP-7 | |
| Nucleating agent/amount |  | phr | — | NA-21/0.2 | — | NA-11/0.1 | NA-21/0.2 |
| MFR |  | g/10 min | 23 | 26 | 18 | 19 | 20 |
| C2 content |  | wt % | 0 | | | 3.8 | |
| Melting curve configuration | DSC | — | Non-broad | Non-broad | Non-broad | Non-broad | Non-broad |
| Tm | DSC | °C. | 162.6 | 166.0 | 142.8 | 145.2 | 145.9 |
| Half-value width on higher temperature side from Tm | DSC | °C. | 6.4 | 4.0 | 10.2 | 6.1 | 6.1 |
| Flexural modulus |  | MPa | 1680 | 2170 | 910 | 1020 | 1030 |
| Izod impact value | 23°C. | J/m | 22 | 28 | 51 | 57 | 57 |
| Heat distortion temperature | 0.45 MPa | °C. | 112 | 134 | 92 | 94 | 92 |
| Haze | 2 mm thickness | % | 87 | 48 | 77 | 64 | 27 |
| High-rate impact strength, 23°C., 3 m/sec | Total absorbed energy | J | 0.3 | 0.3 | 19 | 16 | 19 |
| High-rate impact strength, 5°C., 3 m/sec | Total absorbed energy | J | 0.3 | 0.3 | 1.0 | 0.5 | 0.7 |
| High-rate impact strength on stretch blow molded bottle side face (0.8 mm), 23°C., 1 m/sec | Total absorbed energy | J | 0.1 | 0.1 | 1.0 | 0.7 | 1.0 |
| Haze through side surface of stretch blow molded bottle |  | % | 9 | 6 | 12 | 7 | 4 |
| Stretch blow molding temperature width | Surface temperature width | °C. | 1 | 1 | 2 | 2 | 2 |

TABLE 4

|  |  |  | Ex. 6 | Ex. 7 | Ex. 8 |
|---|---|---|---|---|---|
| Propylene resin |  |  | PP-1/PP-8 (7/3) | PP-1/PP-8 (9/1) | PP-1/PP-3 (7/3) |
| Nucleating agent/amount | — | phr | NA-21/0.2 | NA-21/0.2 | NA-21/0.2 |
| MFR |  | g/10 min | 24 | 24 | 24 |
| C2 content |  | wt % | 3.4 | 4.3 | 4.3 |
| Tm | DSC | °C. | 145.4 | 108.0/145.2 | 112.2 |
| Half-value width on higher temperature side from Tm | DSC | °C. | 5.0 | 5.0 | 24.8 |
| Flexural modulus |  | MPa | 710 | 600 | 600 |
| Izod impact value | 23°C. | J/m | 95 | 150 | 166 |
| Heat distortion temperature | 0.45 MPa | °C. | 75 | 69 | 68 |
| Haze | 2 mm thickness | % | 19 | 16 | 15 |
| High-rate impact strength, 23°C., 3 m/sec | Total absorbed energy | J | 20 | 18 | 18 |
| High-rate impact strength, 5°C., 3 m/sec | Total absorbed energy | J | 2.0 | 20 | 20 |
| High-rate impact strength on stretch blow molded bottle side face (0.8 mm), 23°C., 1 m/sec | Total absorbed energy | J | 5 | 6 | 6 |
| Haze through side surface of stretch blow molded bottle |  | % | 2 | 2 | 2 |
| Stretch blow molding temperature width | Surface temperature width | °C. | 21 | 10 | 12 |

The results set forth in Tables 1 to 4 show that the polypropylene resins of the present invention have drastically improved transparency and impact resistance and have excellent flexibility.

The polypropylene resins of the present invention are dramatically improved in stretch blow moldability and can be easily stretch blow molded unlike conventional polypropylenes.

The bottles obtained are highly transparent and are lightweight, as much as 30% lighter than conventional PET bottles. In addition, the bottles of the present invention are very flexible and can be easily squeezed for disposal. Thus, the bottles of the present invention are very useful.

INDUSTRIAL APPLICABILITY

The polypropylene resins of the present invention are easily stretch blow molded or direct blow molded, and give containers having excellent transparency, impact resistance and flexibility.

The invention claimed is:

1. A polypropylene resin (R-1) comprising a random polypropylene (P1) having MFR (ASTM D 1238, 230° C., 2.16 kg load) of 0.5 to 100 g/10 min and an ethylene content of 3.0 wt % to less than 7.0 wt %, (i) the resin containing the random polypropylene (P1) at not less than 80 wt %, (ii) the resin showing a broad DSC melting curve which has a single melting point peak and in which the maximum intensity peak temperature (Tm) is not more than 120° C. and the half-value width on a higher temperature side from the maximum intensity peak is not less than 20° C.

2. The polypropylene resin (R-1) according to claim 1, which further comprises 0.1 to 0.5 part by weight of an organic phosphate metal salt nucleating agent (C-1) or a sorbitol nucleating agent (C-2) based on 100 parts by weight of the random polypropylene (P1) in the polypropylene resin.

3. A polypropylene resin (R-2) comprising the random polypropylene (P1) of claim 1 and a homopolypropylene or a random polypropylene (P2) having a melting point (Tm) of more than 120° C. and not more than 150° C. and an ethylene content of 0 to 4.5 wt %,
  (i) the resin containing the polypropylene (P1) and the homopolypropylene or random polypropylene (P2) combined at not less than 80 wt %,
  (ii) the proportion of the random polypropylene (P1) being 60 to 99 wt % and the proportion of the homopolypropylene or random polypropylene (P2) being 1 to 40 wt % based on 100 wt % of the total of (P1) and (P2),
  (iii) the polypropylene resin further comprising 0.1 to 0.5 part by weight of an organic phosphate metal salt nucleating agent (C-1) or a sorbitol nucleating agent (C-2) based on 100 parts by weight of (P1) and (P2) combined.

4. The polypropylene resin according to any one of claims 1 to 3 which is used for the production of stretch blow molded containers.

5. The polypropylene resin according to any one of claims 1 to 3 which is used for the production of direct blow molded containers.

6. A stretch blow molded container produced by stretch blow molding the polypropylene resin of claim 4.

7. The stretch blow molded container according to claim 6, which is produced by stretch blow molding the polypropylene resin at a stretch ratio of not less than 1.5 both in the longitudinal and lateral directions and has a haze value of not more than 4%/mm per unit thickness as measured through a side face of the container in accordance with ASTM D 1003.

8. A direct blow molded container produced by direct blow molding the polypropylene resin of claim 5.

* * * * *

UNITED STATES PATENT AND TRADEMARK OFFICE
CERTIFICATE OF CORRECTION

| | |
|---|---|
| PATENT NO. | : 7,973,100 B2 |
| APPLICATION NO. | : 12/310883 |
| DATED | : July 5, 2011 |
| INVENTOR(S) | : Isao Wada and Hiroyuki Uekita |

It is certified that error appears in the above-identified patent and that said Letters Patent is hereby corrected as shown below:

Title Page;

On Front Cover, Item (73) should read:

(73) Assignees: Mitsui Chemicals, Inc., Tokyo (JP);
Prime Polymer Co., Ltd., Tokyo (JP)

Signed and Sealed this
Eighteenth Day of October, 2011

David J. Kappos
*Director of the United States Patent and Trademark Office*